(No Model.)

F. I. HITCHCOCK.

WEIGHING SCALE.

No. 322,100.    Patented July 14, 1885.

Witnesses
Wm A Jones
J. S. Wooster

Inventor
Frank I. Hitchcock
By A. M. Wooster
atty.

(No Model.)

F. I. HITCHCOCK.
WEIGHING SCALE.

No. 322,100.  3 Sheets—Sheet 2.

Patented July 14, 1885.

Witnesses
Wm A. Jones
J. T. Wooster

Inventor
Frank I. Hitchcock
By J. T. Wooster
atty.

(No Model.) 3 Sheets—Sheet 3.

F. I. HITCHCOCK.
WEIGHING SCALE.

No. 322,100. Patented July 14, 1885.

Witnesses:
E. C. Perkins.
J. S. Wooster

Inventor,
Frank I. Hitchcock
By J. S. Wooster
atty.

United States Patent Office.

FRANK I. HITCHCOCK, OF BRIDGEPORT, CONNECTICUT.

WEIGHING-SCALE.

SPECIFICATION forming part of Letters Patent No. 322,100, dated July 14, 1885.

Application filed April 17, 1885. (No model.)

*To all whom it may concern:*

Be it known that I, FRANK I. HITCHCOCK, a citizen of the United States, residing at Bridgeport, in the county of Fairfield and State of Connecticut, have invented certain new and useful Improvements in Weighing-Scales; and I do hereby declare the following to be a full, clear, and exact description of the invention, such as will enable others skilled in the art to which it appertains to make and use the same.

My invention relates to the class of scales which indicate the excess or deficiency of the article being weighed relatively to any desired weight, as illustrated in my former patent, No. 285,815, dated October 2, 1883.

My present improvements have for their object to simplify and improve the construction and mode of operation of this class of scales.

In describing my invention I shall refer by letters to the accompanying drawings, forming part of this specification, in which—

Figure 1:
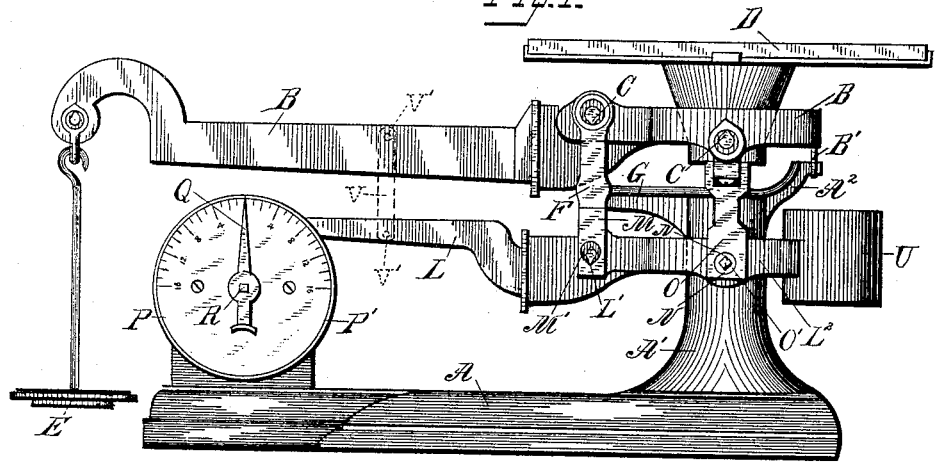
Figure 2:
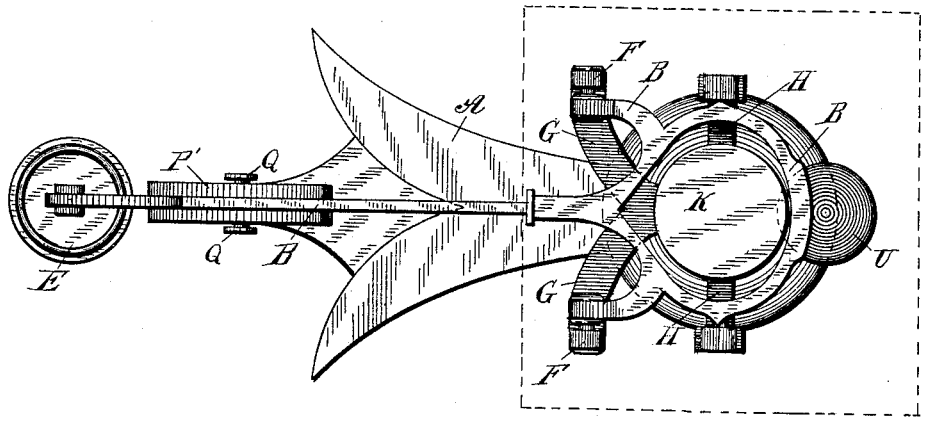
Figure 3:
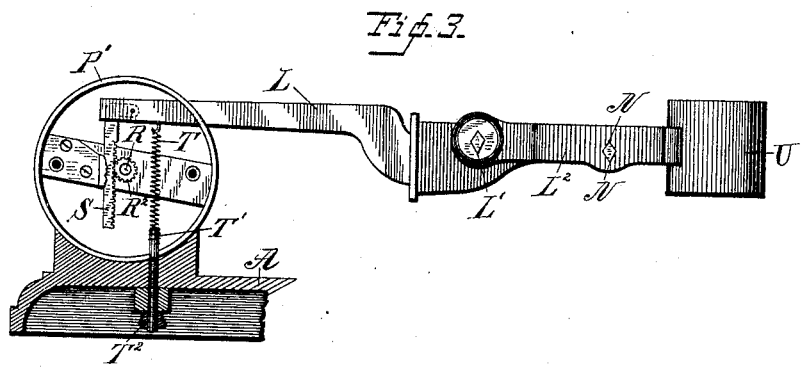
Figure 4:
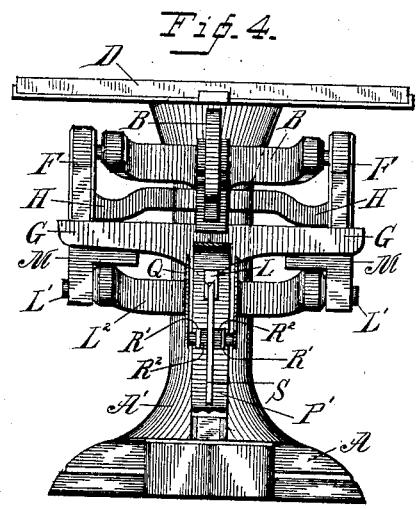
Figure 5:
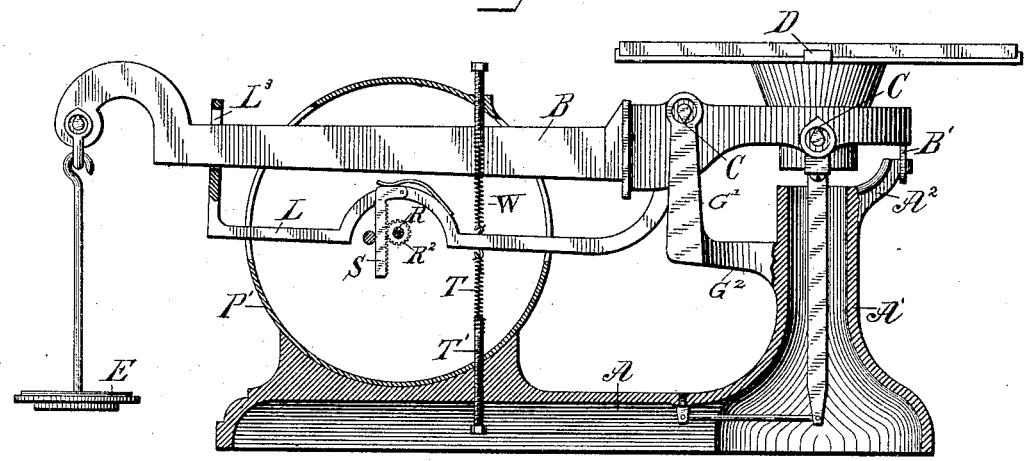
Figure 6:
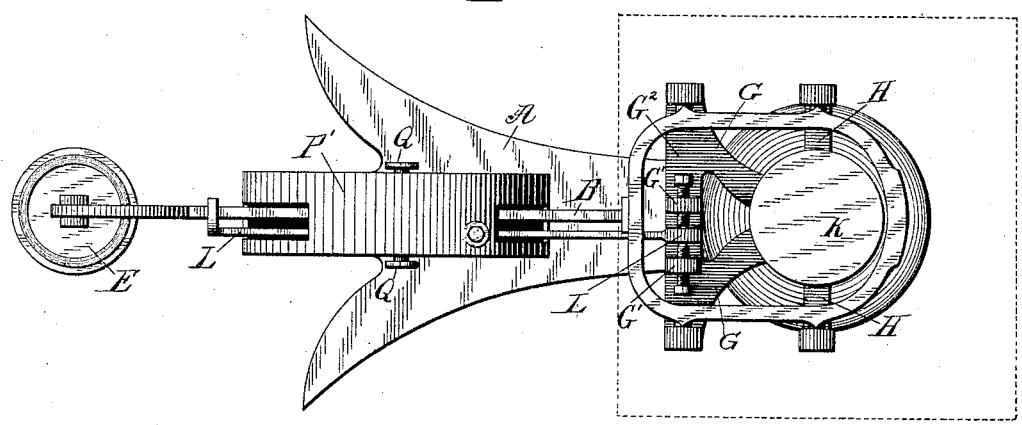

Figure 1 is a side elevation of an ordinary butter-scale with my improvements applied; Fig. 2, a plan view with the platform removed; Fig. 3, a view partly in section, showing the secondary beam detached and the dial and pointer removed; Fig. 4, an end elevation, with the weight-holder and dial-plates removed and the case in section; Fig. 5, a longitudinal section, with the operative parts in full lines, illustrating a modification; and Fig. 6 is a plan view of the same.

The same letters indicate the same parts in all the figures.

A is the base; A', the standard; B, the beam; C, the knife-edges; D, the platform, and E the weight-holder, all of ordinary construction.

The bearings for one pair of knife-edges are in uprights F upon arms G, which project outward from the standard. The bearings for the other pair of knife-edges are carried by a cross-piece, H, which forms part of or upon which the carrier K rests. These parts also, as well as loop B' upon the beam, and lug A² upon the standard, which it engages to prevent displacement of the parts, are of ordinary construction.

It will of course be understood that my invention is equally applicable to scoop and other scales of this class. I have shown it as applied to a butter-scale, that being one of the styles in which it is particularly valuable.

L is a secondary beam, whose knife-edges L' rest in openings M' in parts M, which are attached to or made integral with arms G and uprights F. The rear end of beam L is preferably divided into two arms, L², which curve around the standard, as shown in Fig. 2. These arms are provided with double knife-edges N, which have limited vertical movement in and are adapted to bear upon both top and bottom of openings O' in connections O, which are made integral with or attached to the cross-piece H.

P indicates one of a pair of dial-plates, secured in any suitable manner to the base. The dials are graduated in both directions from the top to indicate pounds and ounces, as shown in Fig. 1, and as will be more fully explained.

Q represents pointers attached to the opposite ends of a shaft, R, which is journaled in suitable supports, R', between the dial-plates. The end of the secondary beam passes in between the dial-plates, and has loosely attached thereto a rack, S, which engages a pinion, R², on the pointer-shaft, thereby causing the pointers to move either to the right or the left over the dial, depending on whether the beam is up or down.

P' is a casing which I preferably use to cover the mechanism between the dials.

T is a spring attached to the secondary beam and to a rod, T', extending up through the base. At the other end of the secondary beam is a weight, U, which acts to hold the spring at its half-opened position. The tension of this spring is adjusted by means of a nut, T², at the lower end of rod T', or in any suitable manner. The normal action of weight U is, of course, to raise the secondary beam, while the normal action of spring T is to draw it down. These opposing forces are so adjusted relatively to each other that their combined action is to hold the secondary beam just balanced, which of course holds the pointers at the zero-marks. The movements of the secondary beam, however, are controlled by the movements of the main beam through connections O, attached to or made integral with cross-piece H.

As already stated, the double knife-edges N upon the secondary beam have limited vertical movement in openings O' in the connections. This is in order to allow the beam to have slight vibration without affecting the secondary beam.

In use, if the article upon the platform is heavier than the weight on weight-holder E, the platform is forced down, and carries the corresponding end of the secondary beam with it, the effect being to raise the rack and turn shaft R and the pointers toward the right, thus indicating upon the dial the excess in weight of the article upon the platform over the weight. If the article upon the platform is lighter than the weight, the platform is raised and the weight goes down, a corresponding movement being imparted to the secondary beam by the connections O. It follows, therefore, that the rack goes down, which turns shaft R and the pointer seen from the point of view toward the left, and indicates upon the corresponding dial the deficiency in weight of the article upon the platform relatively to the weight.

It will of course be understood that upon the opposite dial from that shown in Fig. 1 the indications will be the reverse of what they are in that figure—that is, the pointer will move toward the left to indicate excess of weight, and toward the right to indicate deficiency in weight.

In addition to recording excess or deficiency of weight relatively to a given number of pounds, the pointers and dials may be used to weigh fractional parts of pounds. Suppose that it is desired to weigh two and three-fourths pounds; a two-pound weight may be used and matter placed upon the platform or in the pan, as may be, until an excess of twelve ounces is indicated by the dials; or, if preferred, weights to the amount of three pounds may be placed upon the weight-holder and the exact weight arrived at by adding to or taking from the mass upon the platform until a deficiency of four ounces is indicated by the dials.

By the use of this scale loss to either dealer or purchaser is prevented, as the pointer cannot fail to indicate the exact weight of the article or mass upon the platform or in the scoop.

V (see dotted lines in Fig. 1) illustrates a modification in which the connections O are dispensed with, and the connection between the main and secondary beams is made by a link loosely pivoted to both beams, as indicated at V' V'.

In Figs. 5 and 6 I have illustrated another modification, in which weight U is dispensed with, and the secondary beam is held in its normal position by a spring, T, as in the other form, and a spring, W, placed above the beam and acting against spring T, the combined action of the two springs being the same as that of spring T and the weight in the other form. In this form the secondary beam is curved upward, and is journaled between standards G', projecting upward from a cross-piece, G², between arms G, the pivotal point being in line with the bearings of the main beam. Both main and secondary beams are shown as passing entirely through the casing, and the outer end of the secondary beam as provided with an upwardly-projecting eye or loop, L³, through which the main beam passes. This permits slight movement of the main beam without affecting the secondary beam; but any appreciable movement of the main beam is imparted to the secondary beam, the same as in the other form.

I do not desire to limit myself to the exact construction shown, as it is obvious that the details may be varied within reasonable limits without departing from the spirit of my invention.

I claim—

1. The combination, with the beam, weight-holder, and dial of a scale, of a secondary beam, a connection between said beams, means—for example, a spring and weight acting against each other—for returning the secondary beam to its normal position, and a pointer actuated by the secondary beam for indicating upon the dial excess or deficiency of an article being weighed relatively to a weight upon the weight-holder.

2. The combination, with a scale-beam, a secondary beam with bearings in the same vertical plane, and a loose connection between said beams, of a weight at the outer end of the secondary beam, a spring near the inner end acting against the weight, a dial, and a pointer, actuated by the secondary beam, for indicating the difference in weight between an article at one end and a weight at the other end of the scale-beam.

3. The beam, knife-edges, uprights F, and cross-piece H, in combination with the secondary beam having double knife-edges, parts M, connections O, having openings for knife-edges N, weight U, spring T, and pointers Q.

4. The standard, carrier, beam, dial, and weight-holder, in combination with a secondary beam having arms which encircle the standard and carry a weight, a spring acting against said weight, and a pointer actuated by the secondary beam, substantially as described.

5. The beam, secondary beam, weight, dial, and spring, in combination with a shaft having a pinion and carrying a pointer or pointers, and a rack pivoted to the secondary beam and engaging the pinion, whereby the pointers may be turned in either direction to indicate difference in weight.

6. In a scale, a beam, and a secondary beam with bearings in the same vertical plane, and a connection between said beam and secondary beam, in combination with a pointer operated in connection with said secondary beam, and a dial having two series of numerals running in opposite directions, as and for the purpose set forth.

In testimony whereof I affix my signature in presence of two witnesses.

FRANK I. HITCHCOCK.

Witnesses:
A. M. WOOSTER,
A. B. FAIRCHILD.